United States Patent

[11] 3,604,090

[72] Inventor Clinton R. Lake
Hartselle, Ala.
[21] Appl. No. 5,003
[22] Filed Jan. 22, 1970
[45] Patented Sept. 14, 1971
[73] Assignee Metco, Incorporated

[54] PROCESS AND APPARATUS FOR PLACING SPACER BETWEEN HUB AND DRUM MEMBERS
7 Claims, 4 Drawing Figs.

[52] U.S. Cl. .......... 29/159 R, 29/200 B
[51] Int. Cl. .......... B21d 53/26, B23p 19/00
[50] Field of Search .......... 29/400, 148.4 D, 159 R, 455 LM, 200 B, 200 A

[56] References Cited

UNITED STATES PATENTS

| | | | |
|---|---|---|---|
| 2,228,930 | 1/1941 | Robinson .......... | 29/200 B |
| 2,633,629 | 4/1953 | Crookston .......... | 29/159 |
| 3,023,494 | 3/1962 | Klein .......... | 29/159 X |
| 3,031,741 | 5/1962 | Bernardi, Sr. .......... | 29/200 A |

*Primary Examiner*—Thomas H. Eager
*Attorney*—Jennings, Carter & Thompson

ABSTRACT: Process and apparatus placing spacer between concentric hub and drum of spool in which one end of hub and drum are supported and retained concentric. Hub rounding and holding die moved into other end of hub and drum rounding and holding die moved into engagement with outer surface of other end of drum retaining outer surface of drum concentric with inner surface of hub while spacer forced inwardly between said other end of hub and said other end of drum.

INVENTOR.
Clinton R. Lake

BY
Jennings, Carter & Thompson
Attorneys

INVENTOR.
Clinton R. Lake
BY Jennings, Carter & Thompson
Attorneys

PROCESS AND APPARATUS FOR PLACING SPACER BETWEEN HUB AND DRUM MEMBERS

BACKGROUND OF THE INVENTION

This invention relates to a process and apparatus for assembling the hub and drum components of spools, such as spools which receive electrical cable and the like and more particularly to means for placing a spacer between the hub and drum components so that the critical surfaces, the drum outside diameter and the hub inside diameter, are retained in proper concentric relationship to each other to reduce to a minimum the total runout variation between the drum outside diameter and the hub inside diameter.

Heretofore in the art to which my invention relates, difficulties have been encountered in the assembly of the hub and drum components of spools due to the fact that the hub and drum components have uneven wall thicknesses due to variation in steel gages and drum and hub components not being perfectly round. Accordingly, a subsequent machine operation is required to maintain a true circular shape and a concentric relationship between the outside diameter of the drum and the inside diameter of the hub.

BRIEF SUMMARY OF INVENTION

Briefly, my improved process and apparatus for assembling the hub and drum components of a spool comprises supporting and retaining one end of the hub and drum in concentric relationship to each other. A hub rounding and holding die is moved into engagement with the inner surface of the other end of the hub while a drum rounding and holding die is moved into engagement with the outer surface of the other end of the drum, thus retaining the outer surface of the drum concentric with the inner surface of the hub. While holding the hub and drum components in this position, a spacer member is forced inwardly between said other end of the hub and said other end of the drum.

Apparatus embodying features of my invention and which may be employed to carry out my improved process is shown in the accompanying drawings, forming a part of this application, in which.

Figure 1:
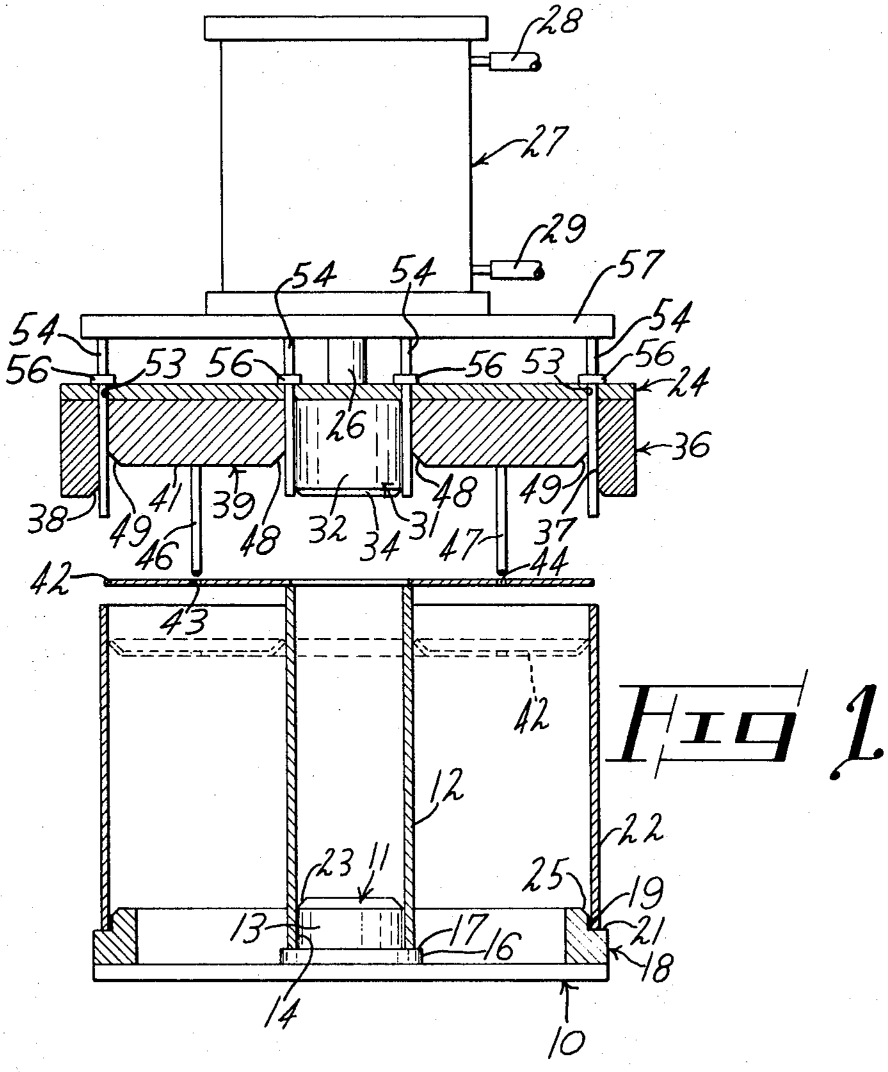
FIG. 1 is a vertical sectional view through the apparatus, parts being in elevation, showing the hub and drum components supported by hub and drum guide members prior to forcing the spacer member between the hub and drum members.
Figure 2:
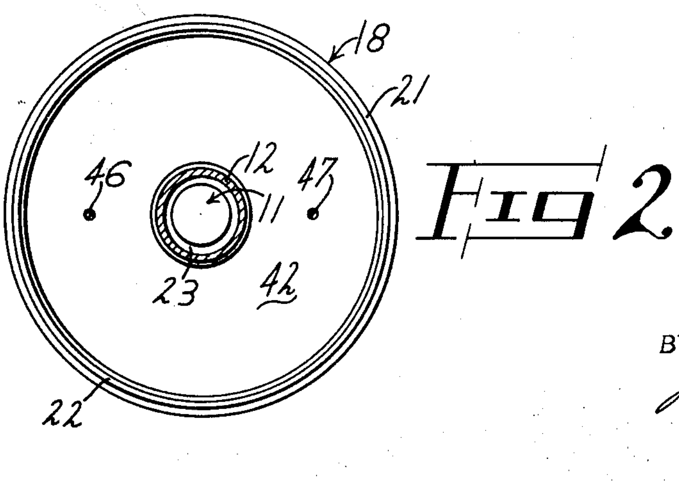
FIG. 2 is a view taken generally along the line 2—2 of FIG. 4.
Figures 3, 4:
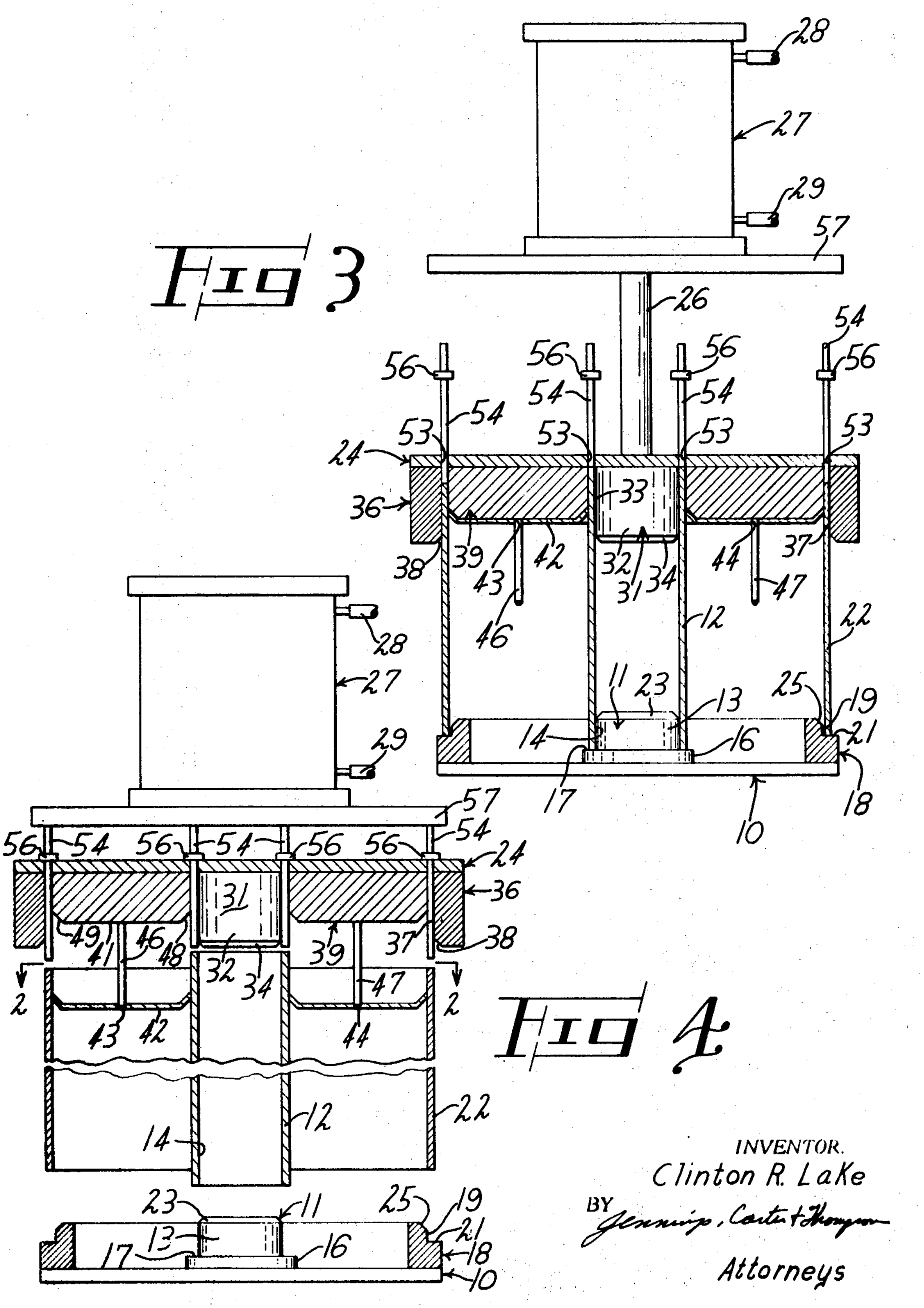
FIG. 3 is a view corresponding to FIG. 1 showing the position of the spacer setter and the hub and drum rounding and holding dies after the spacer member has been forced inwardly between the hub and drum members; and, FIG. 4 is a view corresponding to FIGS. 1 and 3 showing the spacer member in place after the hub and drum rounding and holding dies have been separated from the hub and drum members.

Referring now to the drawings for a better understanding of my invention, I show a stationary mounting plate 10 having a hub guide 11 mounted in position to enter and engage the inner surface of a hub member 12, as shown in FIGS. 1 and 3. That is, the hub guide 11 is provided with a cylindrical surface 13 which engages the inner surface 14 of the hub member 12. The hub guide 11 is provided with an enlarged diameter portion 16 which defines a shoulder 17 that abuts the adjacent end of the hub member 12, as shown in FIGS. 1 and 3. The enlarged diameter portion 16 of the hub guide 11 is secured rigidly to the mounting plate 10 whereby it is retained in a predetermined position.

Rigidly secured to the mounting plate 10 outwardly of and concentric with the hub guide 11 is a drum guide 18 having a reduced diameter portion 19 which defines a shoulder 21 which engages the adjacent end of a drum member 22, as shown. The reduced diameter portion 19 is generally concentric with the outer surface 13 of the drum guide 11 whereby the adjacent ends of the hub member 12 and drum member 22 are retained in generally concentric relationship to each other. To facilitate insertion of the hub member 12 and drum member 22 over the adjacent ends of the hub and drum guides 11 and 18, the upper ends of the hub and drum guides are beveled as at 23 and 25, respectively.

Mounted for axial movement toward and away from the hub member 12 and drum member 22 is a movable mounting plate 24 which is carried by a piston rod 26 which in turn is operatively connected to a fluid pressure-operated ram 27. Fluid under pressure is introduced into and exhausted from the ram 27 by suitable conduits 28 and 29. Secured to the movable mounting plate 24 in axial alignment with the hub guide 11 is a hub rounding and holding die 31 having a cylindrical surface 32 which engages the inner surface 33 of the hub member 12 opposite the end thereof engaged by hub guide 11. The end of the hub rounding and holding die 31 is beveled as at 34 to facilitate insertion into the adjacent end of the hub member 12.

Secured rigidly to the movable mounting plate 24 and surrounding the hub rounding and holding die 31 is a drum rounding and holding die 36 having an inner surface 37 which is concentric with the outer surface 32 of the hub rounding and holding die 31 and is adapted to engage the outer surface of the drum member 22 at the end thereof opposite the end engaged by the drum guide 18. To facilitate insertion of the adjacent end of drum member 22 into the drum rounding and holding die 36, the end of the die 36 receiving the drum member 22 is beveled as at 38. Secured rigidly to the movable mounting plate 24 intermediate the dies 31 and 36 is an annular spacer setter 39 which is adapted to move inwardly between the hub member 12 and the drum member 22, as shown in FIG. 3 upon movement of the mounting plate 24 toward mounting plate 10. As shown in FIGS. 1, 3 and 4, the spacer member 39 is provided with a relatively flat surface 41 which is adapted to engage an annular spacer member 42 after the dies 31 and 36 engage the hub member 12 and drum member 22, respectively, whereby the spacer member 42 is moved from the solid line position to the dotted line position shown in FIG. 1 upon movement of the movable mounting plate 24 toward the stationary mounting plate 10.

The spacer member 42 is provided with openings 43 and 44 therethrough for receiving elongated guide members 46 and 47, respectively, which are carried by and project from the surface 41 of the spacer setter 39, as shown. The inner and outer edges of the spacer setter 39 are beveled as at 48 and 49, respectively, whereby upon forcing the spacer member 39 between the hub member and drum member, the inner and outer edges of the annular spacer member 42 extend upwardly at an angle relative to the central portion thereof. Accordingly, the inner and outer edges of the annular spacer member 42 engage the outer surface of the hub member 12 and the inner surface of the drum member 22, respectively, with a friction fit whereby the hub member and drum member are held in concentric relationship to each other upon separation from the spacer setter 39 and the hub and drum rounding and holding dies 31 and 36, respectively. As shown in FIG. 1, the annular spacer member 42 is of a diameter greater than the inside diameter of the drum member 22 prior to insertion between the drum and hub member whereby the spacer member 42 is distorted to conform to the adjacent surfaces of the hub and drum members while they are held in position by the rounding and holding dies 31 and 36. Accordingly, upon forcing the spacer member 42 inwardly between the hub member 12 and drum member 22, the inner surface of the hub 12 is concentric with the outer surface of the drum member 22.

After the spacer member 42 has been forced inwardly between the hub member 12 and the drum member 22, it is necessary to eject the assembled unit from the spacer setter 39 and the hub and drum rounding and shaping dies 31 and 36 by force. This is accomplished by providing angularly spaced openings 53 through the movable mounting plate 24 in alignment with the annular spaces surrounding opposite sides of the spacer setter 39 and in alignment with the adjacent ends of the hub and drum members for receiving elongated ejector members 54 which are adapted to engage the adjacent ends of the hub and drum members upon movement of the spacer setter 39 between the hub member 12 and drum member 22. Each elongated ejector member 54 is adapted for sliding movement relative to its openings 53 and a suitable stop member 56 is carried thereby to limit downward movement of the ejector member 54.

A stationary stop plate 57 is carried by the ram 27 in position to engage the upper ends of the elongated ejector members 54 upon a predetermined amount of movement of the movable plate 24 toward the stop plate 57. Accordingly, with the spacer setter 39 in the position shown in FIG. 3, the ends of the ejector members 54 engage the adjacent edges of the hub member 12 and drum member 22. Upon movement of plate 24 away from the stationary plate 10, the hub and drum guides 11 and 18, respectively, are separated from the adjacent ends of the hub and drum members. The assembled hub and drum members with the spacer member 42 forced therebetween is then elevated until the upper ends of the ejector members 54 engage the stop plate 57. Continued movement of the mounting plate 24 away from stationary plate 10 causes the movable plate 24 to move relative to the ejector members 54 whereby the adjacent end of the hub member 12 and the adjacent end of the drum member 22 are ejected. That is, upon engagement of the ejector members 54 with the stop plate 57, further movement of the ejector members and the hub and drum member is limited whereupon the movable mounting member 24, together with the spacer setter 39 and the rounding and holding dies 31 and 36, move away from the hub and drum members to the position shown in FIG. 4.

From the foregoing description, the operation of my improved apparatus and the manner in which my improved process is carried out will be readily understood. With the movable plate 24 in the raised position, as shown in FIG. 1, the lower ends of the hub and drum members are inserted over the hub guide 11 and drum guide 18, respectively, whereby the supported ends of the hub and drum members are generally concentric relative to each other. With the hub member 12 and drum member 22 thus supported on the stationary plate 10, the spacer member 42 is positioned whereby the openings 43 and 44 therein receive the ends of the elongated guide members 46 and 47, respectively. Fluid under pressure is introduced through conduit 28 whereby the piston rod 26 of ram 27 moves downwardly to thus move the movable plate 24 toward the stationary plate 10. The elongated guide members 46 and 47 move relative to the spacer member 42 whereby the spacer member is positioned accurately to enter the space between the outer surface of hub member 12 and the inner surface of drum member 22. Continued movement of plate 24 toward stationary plate 10 moves the lower ends of dies 31 and 36 into engagement with the hub member 12 and drum member 22, respectively. That is, the hub rounding and holding die 31 enters the inner surface of the adjacent end of hub member 12 while the inner surface of the drum rounding and holding die 36 engages the outer surface of the drum member 22. After the dies 31 and 36 have thus engaged the adjacent ends of the hub and drum members 12 and 22, respectively, the adjacent surface 41 of the spacer setter 39 engages the spacer member 42 to thus move the spacer member 42 from the solid line position shown in FIG. 1 to the dotted line position whereby the spacer member 42 is forced firmly into engagement with the outer surface of the hub member 12 and the inner surface of drum member 22, as shown in FIG. 3. As the movable member 24 moves downwardly, the ends of the ejector members 54 engage the adjacent ends of the hub and drum members whereby the ejector members 54 move upwardly relative to the movable plate 24, as shown in FIG. 3.

After the spacer setter 39 has moved to the position shown in FIG. 3, fluid under pressure is introduced through conduit 29 whereupon the piston rod 26 moves upwardly to thus move the movable mounting plate 24 away from the stationary plate 10. Upon upward movement of the plate 24, the lower ends of the hub and drum members 12 and 22, respectively, move out of engagement with the hub and drum guides 11 and 18, respectively. The hub and drum members are then moved upwardly with the plate 24 until the upper ends of the ejector members 54 engage the stop plate 57. This limits upward movement of the hub and drum members while the movable mounting plate 24 is still free to move relative to the ejector members 54 and the upper ends of the hub and drum members. Accordingly, further movement of the mounting plate 24 away from the stationary plate 10 moves the spacer setter 39 and the dies 31 and 36 out of engagement with the upper ends of the hub and drum members 12 and 22, respectively.

With the spacer members 42 thus forced accurately between the hub member 12 and the drum member 22, the adjacent inner surface of the hub member 12 is concentric with the outer surface of the drum member 22. The spacer member 42 is welded to the outer surface of the hub member 12 and to the inner surface of the drum member 22 to thus retain the adjacent inner surface of the hub member 12 and the outer surface of the drum member 22 concentric relative to each other.

After the spacer member 42 has been secured in place adjacent one end of the hub and drum assembly, the hub and drum assembly is turned around whereby the end of the hub and drum assembly carrying the spacer member 42 secured thereto is positioned over the hub guide 11 and drum guide 18 whereupon the procedure described above is repeated to thus force a spacer member 42 into the other end of the hub and drum assembly. The second spacer member 42 is then welded in place to the outer surface of the hub member 12 and the inner surface of the drum member 22 as described above. The hub and drum assembly is then ready for receiving the usual flanges or head members in a manner well understood in the art to which my invention relates.

From the foregoing, it will be seen that I have devised an improved process and apparatus for placing a spacer member between hollow hub and drum members of a spool whereby the inner surface of the hub member is concentric with the outer surface of the drum member. By retaining the inner surface of the hub member in a predetermined set position and retaining the outer surface of the drum member in a predetermined set position which is concentric with the inner surface of the hub member and then forcing the spacer member between the hub member and drum member, the spacer member deforms whereby the outer edges move at an angle to the main body portion of the spacer to thus form a shoulder against the inside surface of the drum and the outside surface of the hub, thus providing ample metal adjacent the outer edges of the spacer member which is deformed by the spacer setter to thus assure concentric relationship between the inside diameter of the hub member and the outside diameter of the drum member. Also, by providing means for positioning the spacer member in place between the hub member and the drum member whereby the inner surface of the hub member is concentric with the outer surface of the drum member, my apparatus is adapted for use with metal having uneven wall thicknesses and at the same time I reduce greatly the necessity of subsequent machine operation on the hub and drum assembly.

While I have shown my invention in but one form, it will be obvious to those skilled in the art that it is not so limited, but is susceptible of various other changes and modifications without departing from the spirit thereof.

What I claim is:

1. The process of placing a spacer member between hollow hub and drum members of a spool with said hub and drum members concentric relative to each other which comprises:

a. supporting and retaining one end of said hub member at a predetermined location;

b. supporting and retaining one end of said drum member at a predetermined location outwardly of and generally concentric with said one end of said hub member, c. moving a hub rounding and holding die axially into engagement with the inner surface of the other end of said hub member, d. moving a drum rounding and holding die axially into engagement with the outer surface of said other end of said drum member retaining the outer surface of said other end of said drum member concentric with the inner surface of said other end of said hub member, and e. forcing a spacer member inwardly between said other end of said hub member and said other end of said drum member while the inner surface of said other end of said hub member is concentric with the outer surface of said other end of said drum member.

2. In apparatus for placing a spacer member between hollow hub and drum members of a spool, a. a hub guide disposed to enter and abut one end of a hub member and retain said one end of said hub member in a predetermined position, b. a drum guide surrounding and spaced from said hub guide and disposed to engage one end of a drum member and retain said one end of said drum member in a predetermined position generally concentric with said one end of said hub member, c. a hub rounding and holding die mounted for movement toward said hub guide and axially into engagement with the inner surface of the other end of said hub member, d. a drum rounding and holding die mounted for movement toward said drum guide with the inner surface of said drum rounding and holding die receiving and engaging the outer surface of the other end of said drum member retaining the outer surface of said other end of said drum member concentric with the inner surface of said other end of said hub member, e. a spacer setter engageable with said spacer member and movable inwardly between said other end of said hub member and said other end of said drum member to force said spacer member inwardly between said other end of said hub member and said other end of said drum member while the inner surface of said other end of said hub member is concentric with the outer surface of said other end of said drum member, and f. means to move said spacer setter and said hub and drum rounding and holding dies toward said hub and drum guides to place said spacer member between said other end of said hub member and said other end of said drum member while the inner surface of said other end of said hub member is concentric with the outer surface of said other end of said drum member.

3. Apparatus for placing a spacer member between hollow hub and drum members as defined in claim 2 in which said hub guide and said drum guide are carried by a stationary mounting plate.

4. Apparatus for placing a spacer member between hollow hub and drum members as defined in claim 2 in which elongated guide members project from the surface of said spacer setter which engages said spacer member, there being openings through said spacer member receiving said guide members with a sliding fit so that said spacer member is held in proper position for movement between said other end of said hub member and said other end of said drum member.

5. Apparatus for placing a spacer member between hollow hub and drum members as defined in claim 2 in which said hub rounding and holding die, said drum rounding and holding die and said spacer setter are carried by a movable mounting plate with the surface of said spacer setter which engages said spacer member being in position to move inwardly between said other end of said hub member and said other end of said drum member after said hub and drum rounding and holding dies have engaged said hub member and drum member respectively.

6. Apparatus for placing a spacer member between hollow hub and drum members as defined in claim 5 in which said movable mounting plate is operatively connected to a power actuated ram which moves said movable mounting plate selectively toward and away from said hub member and drum member.

7. Apparatus for placing a spacer member between hollow hub and drum members as defined in claim 5 in which elongated ejector members are carried by said movable mounting plate in position to engage said other ends of said hub and drum members, there being openings through said mounting plate receiving said ejector members with a sliding fit so that said movable mounting plate moves relative to said ejectors as said movable mounting plate moves toward said other ends of said hub and drum members, and a stop member is mounted in position to engage said ejector members upon predetermined movement of said movable mounting member away from said hub and drum guides so that said ejector members limit further movement of said hub and drum members whereupon said movable mounting member moves away from said hub and drum members.